(12) United States Patent
Brandner et al.

(10) Patent No.: US 11,752,672 B2
(45) Date of Patent: Sep. 12, 2023

(54) MOULDING TOOL FOR FOAM OVERMOLDING A GLASS PANE AND AT LEAST ONE INSERT PART

(71) Applicant: BBG GMBH & CO. KG, Baern (DE)

(72) Inventors: Hans Brandner, Baern (DE); Richard Ortloff, Baern (DE)

(73) Assignee: BBG GMBH & CO. KG, Baern (DE)

( * ) Notice: Subject to any disclaimer, the term of this patent is extended or adjusted under 35 U.S.C. 154(b) by 478 days.

(21) Appl. No.: 16/768,832

(22) PCT Filed: Nov. 30, 2018

(86) PCT No.: PCT/EP2018/083176
§ 371 (c)(1),
(2) Date: Jun. 1, 2020

(87) PCT Pub. No.: WO2019/106160
PCT Pub. Date: Jun. 6, 2019

(65) Prior Publication Data
US 2021/0138701 A1 May 13, 2021

(30) Foreign Application Priority Data
Dec. 1, 2017 (DE) ...................... 10 2017 128 614.4

(51) Int. Cl.
*B29C 44/60* (2006.01)
*B29C 44/12* (2006.01)
(Continued)

(52) U.S. Cl.
CPC .......... *B29C 44/60* (2013.01); *B29C 44/1271* (2013.01); *B29C 44/58* (2013.01);
(Continued)

(58) Field of Classification Search
None
See application file for complete search history.

(56) References Cited

U.S. PATENT DOCUMENTS

2003/0154908 A1* 8/2003 Webber ............... H01L 21/6708
117/44
2009/0066120 A1 3/2009 Takishima et al.
(Continued)

FOREIGN PATENT DOCUMENTS

CN 203110246 U 8/2013
DE 29704030 * 5/1997 ............ B29C 44/12
(Continued)

OTHER PUBLICATIONS

English translation of DE 29704030 (Year: 1997).*

*Primary Examiner* — Alison L Hindenlang
*Assistant Examiner* — Olukorede Esan
(74) *Attorney, Agent, or Firm* — Albert Bordas, P.A.

(57) ABSTRACT

The invention relates to a molding tool having a tool upper part (10) and a tool lower part (20), having a glass pane (30) arranged between tool upper part (10) and tool lower part (20) and at least one sheet metal insert part (32; 321, 322, 323, 324) that can be connected to the glass pane (30) by means of foam overmolding (36) made of plastic. For an increased process reliability when connecting sheet metal insert parts (32; 321, 322, 323, 324) to panes (30), the invention provides that at least one sensor (40) for detecting the position of the sheet metal insert part (32; 321, 322, 323, 324) is arranged on the tool upper part (10) and/or the tool lower part (20) on the side of the glass pane (30) that is located opposite the at least one sheet metal insert part (32; 321, 322, 323, 324).

11 Claims, 3 Drawing Sheets

Figure 1:
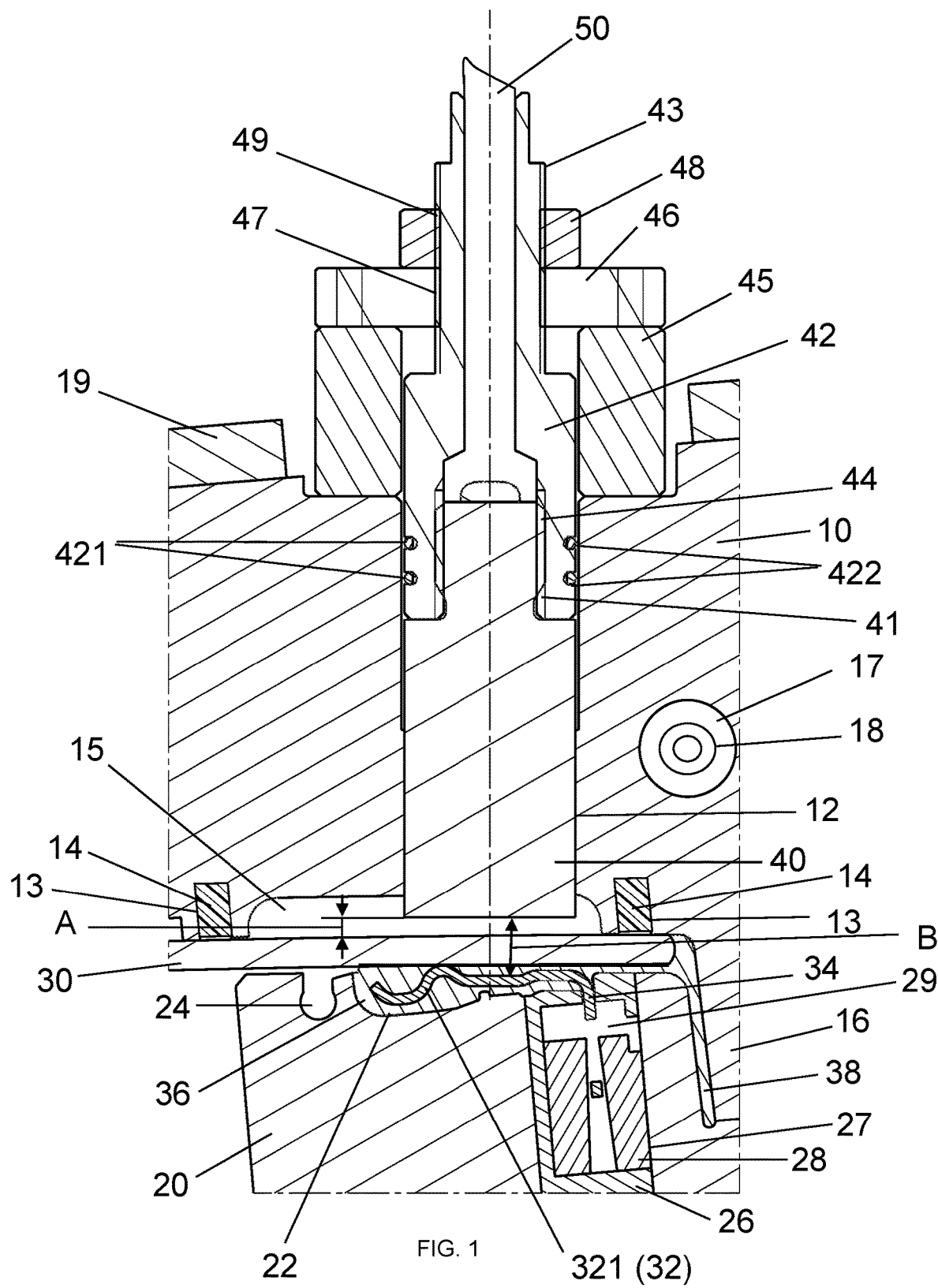

(51) Int. Cl.
  *B29C 44/58* (2006.01)
  *B29K 75/00* (2006.01)
  *B29K 105/04* (2006.01)
  *B29K 705/00* (2006.01)
  *B29K 709/08* (2006.01)
  *B29L 31/30* (2006.01)

(52) U.S. Cl.
  CPC ...... *B29K 2075/00* (2013.01); *B29K 2105/04* (2013.01); *B29K 2705/00* (2013.01); *B29K 2709/08* (2013.01); *B29L 2031/30* (2013.01)

(56) References Cited

U.S. PATENT DOCUMENTS

| | | | |
|---|---|---|---|
| 2013/0056893 A1* | 3/2013 | Nielsen | B29C 45/77 264/40.1 |
| 2015/0033757 A1* | 2/2015 | White | F01D 17/02 60/803 |
| 2021/0277346 A1* | 9/2021 | Eidt | C12M 23/38 |
| 2022/0080663 A1* | 3/2022 | Leibig | B29C 64/321 |

FOREIGN PATENT DOCUMENTS

| | | |
|---|---|---|
| DE | 29704030 U1 | 5/1997 |
| DE | 202008014027 U1 | 4/2009 |
| DE | 102015000618 A1 | 8/2015 |
| EP | 2586587 A1 | 5/2013 |

* cited by examiner

MOULDING TOOL FOR FOAM OVERMOLDING A GLASS PANE AND AT LEAST ONE INSERT PART

The invention relates to a molding tool for foam overmolding a pane and at least one sheet metal insert part according to the preamble of claim 1.

A molding tool having a tool lower part and a tool upper part pivotably mounted relative to the same is known from DE 203 11 439 U1. With this molding tool, panes with sheet metal insert parts can be connected by a foam molding made of plastic, in particular with polyurethane (PU). If a sheet metal insert part is forgotten or incorrectly positioned when preparing the foam overmolding, this can no longer be corrected after the foam overmolding, and the entire foam-overmolded glass pane must be disposed of as scrap.

The object of the invention is to provide a tool which results in increased process reliability when connecting sheet metal insert parts to panes by means of foam overmolding.

This object is achieved by a molding tool with the features of claim 1. Advantageous embodiments of the invention are specified in the dependent claims relating to that claim.

The present invention ensures a flawless series production. By avoiding rejects, considerable economic benefits combined with an environmentally friendly conservation of resources are achieved.

A preferred field of application of the invention may be, for example, molds for foam-overmolding flat components such as glass covers or plastic panes for vehicle roofs with polyurethane (PU).

The at least one sensor, which is designed, in particular, as an inductive sensor, makes it possible to detect the presence and the correct position of each sheet metal insert part through the pane. As a result, the sensor does not come into direct contact with the area of the molding tool in which the foam overmolding is produced. This protects the sensor from contamination on the one hand, and on the other hand the pane positioned at a closer distance from the sensor also keeps excessive heat emanating from the liquid plastic away from the sensor. Mechanical position checking means that are commonly used in the prior art such as pins, which engage in positioning holes on the sheet metal insert part and are provided on the relevant tool lower part or tool upper part, can be dispensed with by the invention.

In the case of a plurality of sheet metal insert parts, at least one sensor is preferably assigned to each sheet metal insert part. The foam overmolding process on the tool is only initiated by evaluation electronics when each of the sensors signals the correct position of the assigned sheet metal insert part.

In an advantageous embodiment, the at least one sensor for adjusting the distance A to the pane is movably mounted on the tool upper part or on the tool lower part. In this application, both the tool upper part and the tool lower part are always mentioned because the pane can be arranged in the mold in such a way that the pane is either inserted into the lower part of the mold with its outer side pointing down and the sheet metal insert parts and the production of the foam overmold supplied from the side of the tool upper part or the pane is held on the tool upper part with its outside facing upward and the sheet metal insert parts and the cavity for the production of the foam overmold are positioned on the side of the tool lower part. The cavity for the production of the foam overmolding can optionally also be partially formed on the tool upper part and the tool lower part at the same time.

According to an advantageous embodiment, the sensor is arranged on a receiving adapter, the position of which can be adjusted by means of a thread relative to the tool upper part or the tool lower part that receives it. Due to the fine adjustability that is made possible by the thread, a fine adjustment of the distance A between the sensor and the surface of the pane facing it or a fine adjustment of a distance B between the sensor and the sheet metal insert part positioned on the other side of the pane is easily possible. On the one hand, the receiving adapter protects the sensor from damage as much as possible, and on the other hand, it can also be easily removed from the respective tool part (tool upper part or tool lower part) for an easy replacement of a possibly damaged sensor.

In a further advantageous embodiment, the sensor is connected to the receiving adapter by means of a thread, which makes a sensor easier to replace.

In a particularly advantageous embodiment, the receiving adapter is adjustably mounted on the tool upper part or on the tool lower part by means of a spacer ring and/or an adjusting ring. After the distance between the sensor and the pane or the sensor and the sheet metal insert part is set correctly for an optimal detection, this position of the spacer ring in which the sensor has its optimally reliable working range can preferably be fixed by means of a lock nut.

A particularly advantageous embodiment of the invention provides that a side of the sensor facing the pane opens into a cavity in which negative pressure can be generated. The partial vacuum improves the thermal insulation of the sensor from the pane on the one hand and the sensor is effectively protected against contamination due to the frequent suction of air from the cavity on the other.

In an advantageous embodiment, the cavity is sealed off from the pane with at least one seal. The seal is preferably arranged directly in a groove on the respective tool part (on the tool upper part or on the tool lower part).

The at least one sheet metal insert part is preferably mounted on the tool upper part or on the tool lower part such that a free end thereof projects at a distance from the pane into a cavity formed on the tool upper part or on the tool lower part. This cavity limits and determines the contour of the overmold. Due to the distance to the pane, the material of the plastic foam overmolding also penetrates into a space between the inside of the pane and the sheet metal insert part so that the foam forms an intensive connection on the one hand and on the other a layer for damping vibration and noise between the pane which, for example, serves to connect to an actuating mechanism for the sheet metal insert part. The material of the plastic foam overmolding is also used to compensate for different thermal expansions of the pane and the sheet metal insert part.

The at least one sheet metal insert part is mounted with an end facing away from the pane in at least one bracket arranged or formed on the tool upper part or on the tool lower part. The bracket allows for an exact positioning of the sheet metal insert part.

According to an advantageous embodiment, the sensor is formed by an inductive sensor. Such an inductive sensor is particularly well suited for detecting the presence of metal through a pane. The pane itself is preferably formed from a glass pane but can also be formed from a plastic pane.

Figure 2:
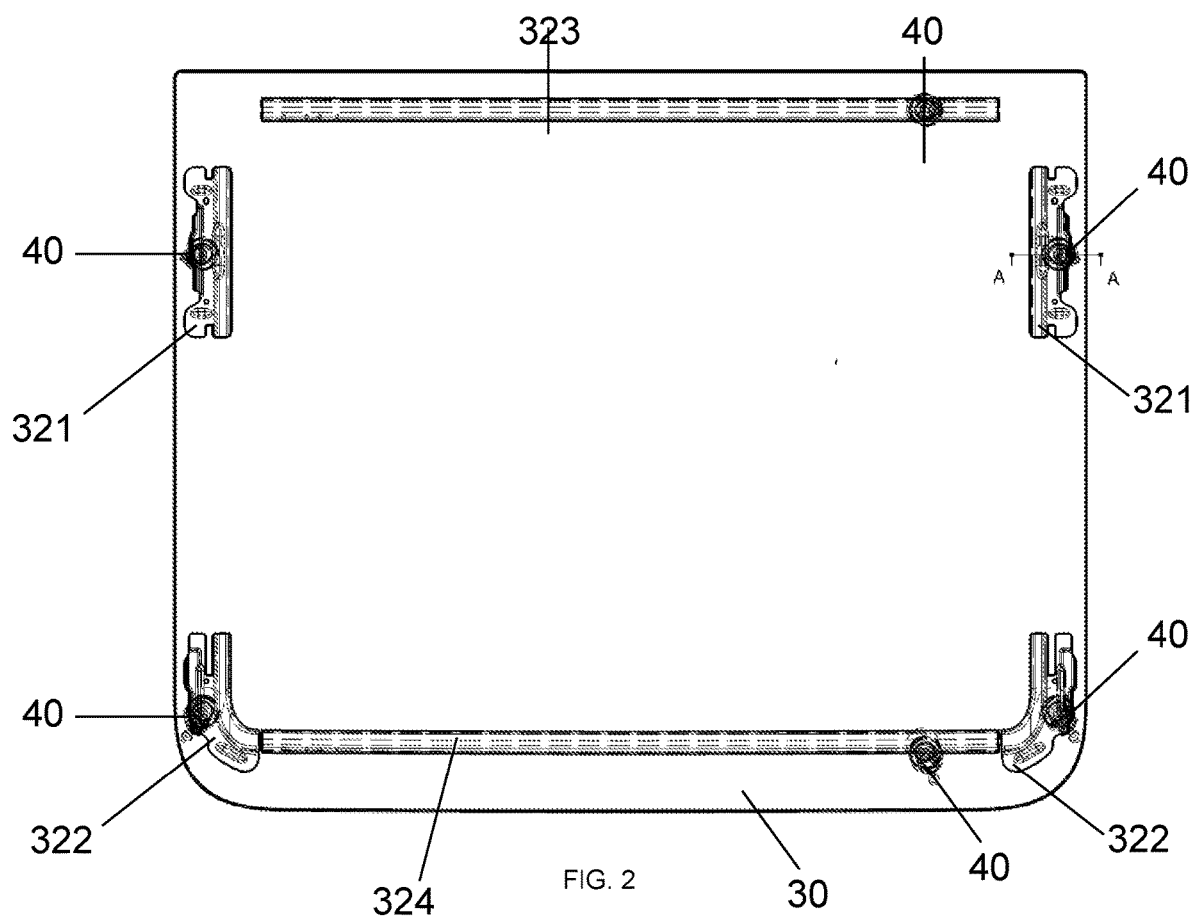
Figure 3:
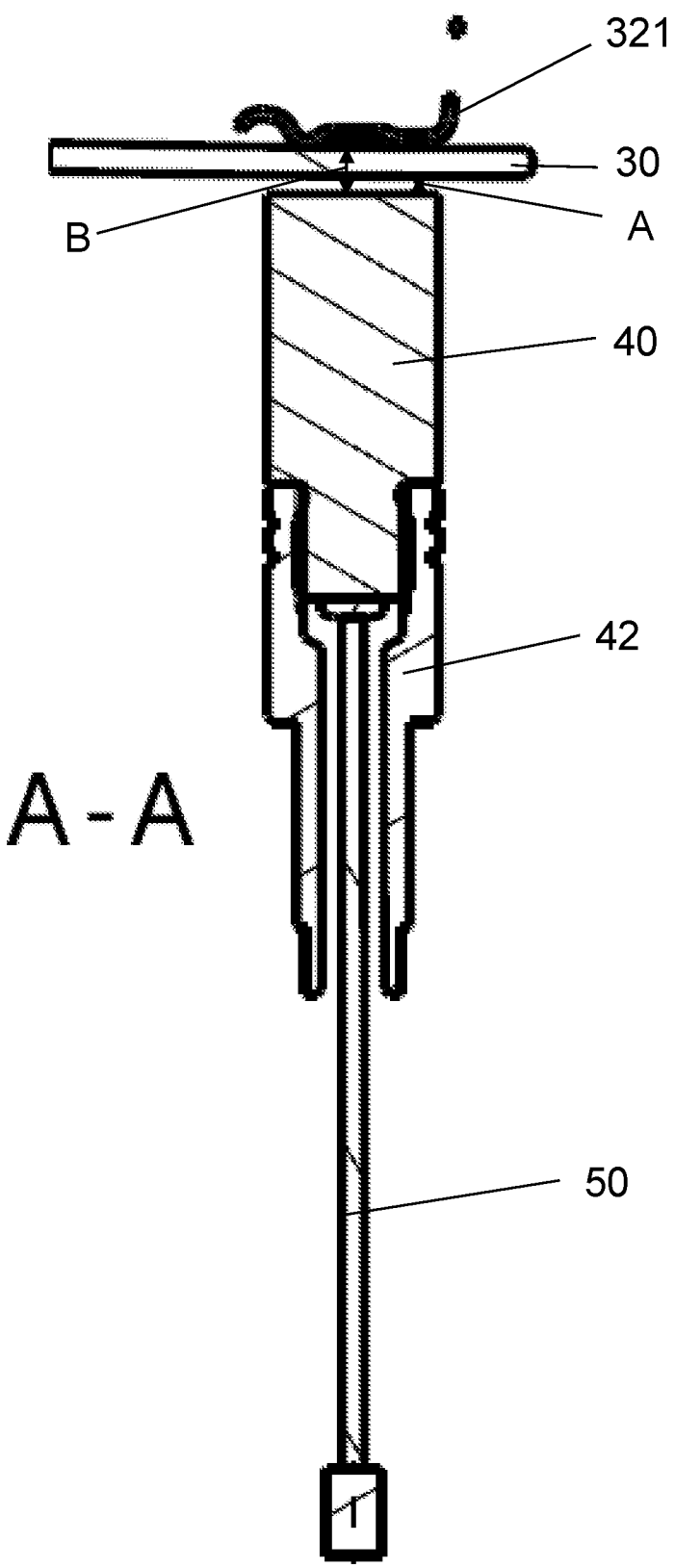

Exemplary embodiments of the tool are explained in more detail below with reference to the drawings. The figures show the following:

FIG. 1 shows a section through part of a tool upper part and a tool lower part in the edge region of a pane with a sheet metal insert part and a sensor arranged on the other side of the pane;

FIG. 2 shows a schematic plan view of the underside of the pane with a plurality of sheet metal insert parts positioned there and a schematic projection to clarify the position of the sensors arranged on the top of the pane for detecting the position of the sheet metal insert parts; and FIG. 3 shows an enlarged detailed view of a sensor with the receiving adapter receiving it according to the section line A-A in FIG. 2.

FIG. 2 shows a pane 30 which can preferably be used as a cover for a glass sliding roof of a vehicle. The pane 30 can be formed from a glass pane made from single-pane safety glass, laminated safety glass, high-tempered glass or also plastic. Layers of film may additionally be embedded on or under the pane 30 or between individual layers of the pane 30.

To attach the actuating mechanism and other accessories, which are not shown, a plurality of sheet metal insert parts are arranged on the inside of the pane 30, which are summarily designated with the reference sign 32. In the exemplary embodiment, two sheet metal insert parts 321 are arranged opposite one another in the rear lateral region of the pane 30, two sheet metal insert part parts 322 are arranged opposite one another in the front lateral region of the pane 30, one sheet metal insert part 323 is arranged parallel to the rear edge of the pane 30 and one sheet metal insert part 324 is arranged parallel to the front edge of the pane 30. FIG. 2 also shows the position of a total of six sensors 40 which monitor the presence and the exact positioning of the sheet metal insert parts.

FIG. 1 shows the edge region of the pane 30 in the region of the sheet metal insert part 321 with a surrounding tool upper part 10 and a tool lower part 20.

The tool lower part 20 has a cavity 22 on its upper side, the contour of which corresponds to a foam overmolding 36, which surrounds the horizontal part of the sheet metal insert part 321 on the underside of the pane 30 in its edge region and thereby firmly connects it to the pane 30.

The tool lower part 20 has a receiving hole 27 on its underside into which a bracket 26 is inserted, which has an opening for a vertical bevel 34 of the sheet metal insert part 321 in its upper horizontal region. The bracket 26 accommodates a holder 28 in its interior, which receives the lower part of the bevel 34 with an essentially vertical slot.

A sealing cavity 29 is formed between the top of the holder 28 and the upper inside of the bracket 26, which serves to receive a seal, which is not shown. The seal ensures that no liquid plastic can get out of the cavity 22 along the bevel 34 into the region of the bracket 26 during the foaming process.

The tool lower part 20 has, on the inside of the cavity 22, a sealing groove 24 which serves to receive a seal (not shown here), which lies against the underside of the pane 30 and which seals the gap between the pane 30 and the cavity 22 with a part which, in FIG. 1, projects to the right and thus forms a shadow gap.

The cavity 22 continues outward from the bevel 34 to the edge of the pane 30 and also surrounds the edge of the pane. A vertical mold cavity is formed in the edge region of the pane 30 between a downwardly projecting edge 16 of the tool upper part 10 and the correspondingly inwardly tapered tool lower part 20 to form a lateral trim 38.

A vertically running hole 12 is formed in the tool upper part 10, which serves to receive a sensor 40. On the underside of the tool upper part 10, a flat cavity 15 is formed, to which a sealing groove 13 is connected to the right and to the left. The sealing grooves 13 each receive a seal 14, the underside of which seals against the top of the pane 30. A vacuum is created in the cavity 15 when the seals 14 are in contact by means of which the top of the pane 30 is held on the upper part of the tool 10 as if by a suction cup.

In addition to the sensor 40, a receiving adapter 42 connected to the sensor 40 is also movably guided in the bore 12. The sensor 40 can be screwed into an inner thread 44 of the receiving adapter 42 with an outer thread 41 and is therefore also easily exchangeable. The receiving adapter 42 has two ring grooves 422 for receiving O-rings 421, which lie one above the other on its outer circumference. These O-rings 421 establish the tightness of the sensor 40 in relation to the cavity 15 so that a partial vacuum can be maintained in the cavity 19.

The receiving adapter 42 has an outer thread 43 in an upper region with a reduced diameter, which interacts with an adjusting ring 46 screwed thereon and a lock nut 48 arranged above it. Below the adjusting ring 46, the receiving adapter 42 is surrounded by a spacer ring 45, the height of which can be adjusted by using one or more spacer rings 45 of different thicknesses that are arranged one above the other. The adjusting ring 46 is axially secured in the upward direction by a part of the tool upper part 10, which is not shown in the figures. By turning the adjusting ring 46 with a tool, which is not shown, that acts laterally on said ring, the distance A between the underside of the sensor 40 and the upper side of the pane 30 and thus at the same time a distance B between the front face of the sensor 40 facing the pane 30 and the sheet metal insert part 32, 321, 322, 323, 324 positioned on the other side of the pane 30 can be set in an exact manner. If the distance A has been correctly set and successfully tested, the adjusting ring 46 is fixed in this position by tightening the lock nut 48.

If the diameter of the sensor 40 is approximately 30 mm, the distance A between the front face of the sensor 40 facing the pane 30 and the surface of the pane 30 facing this is approximately 0.5 mm. The distance B between the front face of the sensor 40 facing the pane 30 and the sheet metal insert part 32, 321, 322, 323, 324 positioned on the other side of the pane 30 ranges from approximately 5 mm to approximately 8 mm if the pane 30 is approximately 3.8 mm thick. The distance B denotes the operating distance of the sensor 40 at which a reliable function of the sensor 40 is guaranteed. This operating distance of approximately 8 mm is followed by a hysteresis range of the sensor 40 of further approximately 4 mm. At a distance B of 12 mm, the nominal operating distance would then be reached for the sensor 40, beyond which no reliable detection would be possible. These relatively narrow operating distances underline the importance of an exact adjustment of the distances A and B of the sensor 40, which is ensured in the invention by the interaction of the receiving adapter 42, the adjusting ring 46 and the spacer rings 45.

A particularly suitable sensor 40 is, for example, an inductive all-steel sensor of the type IC3001K0 made by ipf electronic GmbH, D-58515 Lüdenscheid, which was specially adapted for the applicant's purposes.

The tool upper part 10 is preferably surrounded by an insulating mat 19 in order to avoid unnecessary heat losses on the tool upper part. In the vicinity of the hole 12 that receives the sensor 40, a transverse cooling opening 17 is particularly preferably provided in the material of the tool upper part 10, through which a coolant flows for cooling the sensor 40 or into which a cooling cartridge 18 can be inserted.

The tool shown in the figures is operated as shown in the following steps:

Insert the pane 30 into the opened tool upper part 10,

Generate a partial vacuum in the cavity 15 of the tool upper part 10 for fixing the pane 30 to the tool upper part 10, Insert the sheet metal insert parts 32, 321, 322, 323, 324 into the corresponding brackets 26 on the tool lower part 20, Close the tool by swiveling down or folding down the tool upper part 10 with the pane 30 onto the tool lower part 20, Check the signals of all sensors 40 in the evaluation electronics (not shown) and if all signals indicate the correct positioning of all sheet metal insert parts, Introduce the liquid polyurethane (PU) into the cavity 22 to create the foam overmolding 36.

It is understood by a person skilled in the art that the invention can also be implemented with an inverted arrangement in which the pane 30 may be positioned on the tool lower part 20 and the sheet metal insert parts 32, 321, 322, 323, 324 on the tool upper part 10.

LIST OF REFERENCE SIGNS

10 Tool upper part
12 Hole (in 10)
13 Sealing groove (on 10)
14 Seal (in 13)
15 Cavity
16 Edge
17 Cooling opening (in 10)
18 Cooling cartridge
19 Insulation mat
20 Tool lower part
22 Cavity (in 20)
24 Sealing groove
26 Bracket
27 Receiving hole
28 Holder
29 Seal cavity
30 Pane
32 Sheet metal insert part (general)
321 Sheet metal insert part
322 Sheet metal insert part
323 Sheet metal insert part
324 Sheet metal insert part
325 Sheet metal insert part
326 Sheet metal insert part
34 Bevel (on 32)
36 Foam overmolding
38 (Lateral) trim (on 36)
40 Sensor
41 (Outer) thread (on 40)
42 Receiving adapter
421 O-ring
422 Ring groove (on 42, for 421)
43 (Outer) thread (on 42)
44 Inner thread (on 42)
45 Spacer ring
46 Adjusting ring
47 Inner thread (on 46)
48 Lock nut
49 Inner thread (on 48)
50 Supply line
A Distance (between 30 and 40)
B Distance (between 32 or 321 and 40)

The invention claimed is:

1. Molding tool having a tool upper part (10) and a tool lower part (20), having a glass pane (30) arranged between the tool upper part (10) and the tool lower part (20) and at least one sheet metal insert part (32; 321, 322, 323, 324) that can be connected to the glass pane (30) by means of foam overmolding (36) made of plastic; characterized in that at least one sensor (40) for detecting the position of the sheet metal insert part (32; 321, 322, 323, 324) is arranged on the tool upper part (10) and/or on the tool lower part (20) on the side of the glass pane (30) that is located opposite the at least one sheet metal insert part (32; 321, 322, 323, 324), the at least one sensor (40) for adjusting a distance (A) to the pane (30) is movably mounted on the tool upper part (10) and/or on the tool lower part (20), the sensor (40) is arranged on a receiving adapter (42) whose position relative to the tool upper part (10) or tool lower part (20) receiving the sensor can be adjusted by means of a thread (43), the receiving adapter (42) is adjustably mounted on the tool upper part (10) and/or on the tool lower part (20) by means of a spacer ring (45) and an adjusting ring (46).

2. Molding tool according to claim 1, characterized in that the sensor (40) is connected to the receiving adapter (42) by means of a thread (41).

3. Molding tool according to claim 1, characterized in that the position of the adjusting ring (46) can be fixed by means of a lock nut (48).

4. Molding tool according to claim 1, characterized in that a side of the sensor (40) facing the pane (30) opens into a cavity (15) in which a negative pressure can be generated.

5. Molding tool according to claim 4, characterized in that the cavity (15) is sealed against the pane (30) by at least one seal (14).

6. Molding tool according to claim 1, characterized in that the at least one sheet metal insert part (32; 321, 322, 323, 324) is positioned on the tool upper part (10) or on the tool lower part (20) such that a free end thereof projects at a distance from the pane (30) into a cavity (22) formed on the tool upper part (10) or on the tool lower part (20).

7. Molding tool according to claim 1, characterized in that the at least one sheet metal insert part (32; 321, 322, 323, 324) is positioned with one end facing away from the pane (30) in at least one bracket (26) arranged or formed on the tool upper part (10) or on the tool lower part (20).

8. Molding tool according to claim 1, characterized in that the sensor (40) is formed by an inductive sensor (40).

9. Molding tool according to claim 1, characterized in that the pane (30) is formed by a glass pane.

10. Molding tool according to claim 1, characterized in that at least one cooling opening (17) is provided in the material of the tool upper part (10), and/or the tool lower part (20) is provided in the vicinity of the sensor (40).

11. Molding tool according to claim 10, characterized in that the cooling opening (17) is used to guide a coolant or to receive at least one cooling cartridge (18).

* * * * *